United States Patent [19]

Moran, Jr.

[11] Patent Number: 5,280,105
[45] Date of Patent: Jan. 18, 1994

[54] SEPARATION OF NYLON 6 FROM MIXTURES WITH NYLON 6,6

[75] Inventor: Edward F. Moran, Jr., Clarksboro, N.J.

[73] Assignee: E. I. du Pont de Nemours and Company, Wilmington, Del.

[21] Appl. No.: 4,619

[22] Filed: Jan. 14, 1993

[51] Int. Cl.$^5$ .............................................. C08G 69/46
[52] U.S. Cl. .................................... 528/486; 528/499; 528/502; 528/503
[58] Field of Search ................ 528/486, 499, 502, 503

[56] References Cited

U.S. PATENT DOCUMENTS 3,475,771  11/1969  Quynn ................... 528/486

OTHER PUBLICATIONS

Polymer Handbook, 3rd Edition, John Wiley & Sons, VII, pp. 379, 393, 403 (1989).

Primary Examiner—Harold D. Anderson

[57] ABSTRACT

Mixtures of nylon 6 and nylon 6,6 are separated by solubility difference in aqueous aliphatic carboxylic acid.

7 Claims, No Drawings

SEPARATION OF NYLON 6 FROM MIXTURES WITH NYLON 6,6

BACKGROUND OF THE INVENTION

It has been increasingly important to recycle polymeric and other consumer waste materials. By recovery of useful polymer from scrap material such as nylon carpeting, now sent to landfills, the volume of such material can be reduced. This lessens the burden on landfills and conserves petroleum raw materials. The present invention is an important step in this direction.

SUMMARY OF THE INVENTION

The present invention provides a method for separating nylon 6 polymer from a mixture thereof with nylon 6,6 polymer. The process comprises treating the mixture with an aqueous solution of an aliphatic carboxylic acid at a concentration and temperature sufficient at atmospheric pressure to dissolve nylon 6 polymer while leaving nylon 6,6 and separating the solution of nylon 6 from the nylon 6,6 polymer. As a variation of such process, the mixture of polymers may be treated with the acid at a temperature and concentration sufficient to dissolve both nylon 6 polymer and nylon 6,6 polymer, at atmospheric pressure, cooling the solution to preferentially precipitate nylon 6,6 polymer and separating the solution of nylon 6 from the nylon 6,6 polymer.

DETAILED DESCRIPTION OF THE INVENTION

In accordance with the present invention, nylon 6 polymer is separated from a mixture containing both nylon 6 and nylon 6,6 polymers regardless of whether consumer waste products such as pigments, fillers, or carpet backing and the like are present. Where the polymers are in the form of fiber in a carpet, it is possible to treat the carpet or to shear the face yarn and treat only the yarn.

Regardless of the form of the polymer mixture, it is treated with an aqueous solution of a 1 to 6 carbon aliphatic carboxylic acid to dissolve nylon 6 polymer and to leave undissolved nylon 6,6 polymer and any consumer waste product. Aqueous acetic acid having a concentration of from 50 to 70% is preferred for this purpose. At such concentrations, extraction of the nylon 6 polymer can be achieved by reflux at atmospheric pressure, thereby eliminating the need for pressure equipment, while the dissolution of nylon 6,6 is essentially avoided. The solution of nylon 6 is then separated from the nylon 6,6 polymer and from any insoluble waste products that might be present and if desired the nylon 6 recovered from the solution by techniques well known in the art such as dilution with water or reduction in temperature. A particular advantage of the process is that it can be conducted at temperatures well below the melting point of polypropylene, a material commonly employed in carpet backing. For this and other reasons, the acid and its concentration should be selected such that dissolution of the nylon 6 polymer can be achieved at reflux or lower temperatures.

In an alternative process, the mixture of nylon 6 and nylon 6,6 polymer is treated with the carboxylic acid or an aqueous solution thereof at a concentration and temperature sufficient to dissolve the fiber mixture at atmospheric pressure. The resulting solution of nylon 6 and 6,6 polymer is then separated from backing or other waste, if any, and cooled to preferentially precipitate nylon 6,6 polymer. The precipitate is then separated from the nylon 6 solution by filtration, decanting or other means. For this embodiment the concentration of the acetic acid, for example, should be greater than 70%, preferably at least 80%. The concentration of other carboxylic acid required to dissolve both polymers will be readily determined by those skilled in the art.

The process of this invention can be used with any combination of nylon 6 and 6,6 polymer, thus readily accommodating the variability of feed which occurs when mixed consumer and industrial nylon waste is processed.

The invention is described further in the examples which follow. The examples are presented to illustrate but not to restrict the present invention. Parts and percentages are by weight unless otherwise noted.

EXAMPLE 1

This example illustrates the separation of nylon 6 from nylon 6,6 by selectively dissolving nylon 6 in an aqueous acetic acid solution.

In a flask containing 270 grams of 60% acetic acid solution there was placed 22.5 g nylon 6 film and 15 grams nylon 6,6 fiber. This mixture was heated to 103° C. for 15 minutes. Based on visual observation all of the nylon 6 film had dissolved whereas the nylon 6,6 fibers remained intact. The hot solution was quickly poured out of the flask, and replaced with 135 grams of fresh 60% acetic acid solution. The flask was then reheated at 103° C. for 15 minutes and the hot solution added to the first solution. The combined decantate was allowed to cool, water added to enhance nylon precipitation and then filtered. The collected nylon powder was further washed with water and methanol and dried. The recovered product by differential scanning calorimetry, proved to be nylon 6 with a melting point of 217° C. No nylon 6,6 was detected.

EXAMPLE 2

This example illustrates the solubilization of a mixture of nylon 6 and nylon 6,6 in concentrated acetic acid at the solvent boiling point and the selective precipitation of the nylon 6,6 by cooling.

In a flask containing 270 grams of 90% acetic acid solution, there was placed 15 grams of nylon 6 film and 15 grams of nylon 6,6 fiber. This mixture was heated to 109° C. for 15 minutes at which point all of the nylon 6 film and the nylon 6,6 fiber dissolved. The solution was then allowed to cool. When the flask reached 53° C., considerable solid material had precipitated. At this point the mixture was filtered through a glass fritted jacketed filter funnel which was heated by passing steam through the jacket. The precipitate was then rinsed with 100 grams of fresh 90% acetic acid solution which had been heated to 60° C. followed by a room temperature water wash, all washes being added to the original filtrate. After further water washing and methyl alcohol washing, which was not added to the previous filtrate, the dried precipitate weighed 8.6 grams and based on differential scanning calorimetry, proved to be nylon 6,6 with a melting point of 259° C.

The collected filtrate after cooling was then filtered to recover the solids that had precipitated out below 53° C. These solids after washing and drying weighed 22.6 grams and based on differential scanning calorimetry, proved to be a mixture of nylon 6 and nylon 6,6 with melting points of 218° C. and 258° C. respectively. The total enthalpy changes in joules/g indicated that it was composed of 65% nylon 6 and 35% of nylon 6,6.

EXAMPLE 3

A 2 liter round bottom flask equipped with a bottom drain and heated with an electric heating mantle was used for this experiment. It included a thermocouple well in the flask to monitor temperature and a reflux condenser. It was situated above a 600 ml steam jacketed filter funnel on a vacuum filter. A mechanical stirrer was also installed in the flask which was initially raised up high in the flask so that it could be lowered and used if necessary.

The flask was charged with 22.5 grams sheared nylon 6 carpet face fiber, 50.3 grams whole carpet containing 22.5 grams nylon 6,6 face fiber (cut in pieces to fit in the flask) and a mixture of 364.5 g glacial acetic acid and 40.5 g water. The flask was heated electrically without stirring the contents. The filter funnel was heated by steam.

On heating, the nylon 6 started to dissolve at approximately 63° C. and on further increasing the temperature a positive indication of nylon 6,6 dissolution was observed at 86° C. On reaching 108° C. the stirrer was lowered and rotated gently by hand to insure contact of all the residual backing with the solvent. The mixture was heated at 108° C. for 15 minutes and then the flask contents drained through the heated filter frit into the vacuum flask. On cooling to room temperature the filtrate solidified. The backing material remaining in the flask was essentially free of nylon face fiber.

A portion of the solidified filtrate was washed two times with water and two times with methanol on a filter frit, to remove acetic acid, and air dried to give a powder. Differential scanning calorimetry of the powder gave total enthalpy changes in joules/g which indicated that it was composed of 53% nylon 6 and 47% nylon 6.6.

EXAMPLE 4

Example 3 is repeated except that the flask was charged with 22.5 g nylon 6 staple fiber, 53 grams whole automotive carpet containing approximately 22.5 grams nylon 6,6 face fiber (cut in pieces to fit in the flask) and a mixture of 364.5 g glacial acetic acid and 40.5 g water. On heating the same observations were made as Example 3. The backing material remaining in the flask was essentially free of nylon face fiber.

EXAMPLE 5

Example 3 is repeated except the flask was charged with 22.5 grams sheared nylon 6 carpet face fiber, 50.3 grams whole carpet containing 22.5 grams nylon 6,6 face fiber (cut in pieces to fit in the flask) and 810 g 88% formic acid. The flask was heated electrically without stirring the contents. The filter funnel was heated by steam.

The nylon started to dissolve on initial contact. On reaching 87° C. the paddle stirrer was lowered and rotated gently by hand to insure contact of all the residual backing with the solvent. The mixture was heated to 105° C. over a 15 minute period and then the flask contents drained through the heated filter frit into the vacuum flask. On cooling to room temperature the filtrate remained fluid. The backing material remaining in the flask was essentially free of nylon face fiber.

I claim:

1. A method for removing solid nylon 6 polymer from a mixture thereof with solid nylon 6,6 polymer comprising treating the solid mixture with an aqueous solution of a 1-6 carbon aliphatic carboxylic acid at a concentration and temperature sufficient to dissolve nylon 6 polymer at atmospheric pressure but insufficient to dissolve nylon 6,6 polymer and separating the solution of nylon 6 from the solid undissolved nylon 6,6 polymer.

2. A method according to claims 1 wherein the carboxylic acid is acetic acid.

3. A method according to claim 2 wherein the aqueous solution of acetic acid has a concentration of from 50 to 70%.

4. A method for removing solid nylon 6 polymer from a mixture thereof with solid nylon 6,6 polymer comprising treating the mixture with a 1-6 carbon aliphatic carboxylic acid or aqueous solution thereof at a concentration and temperature sufficient to dissolve both polymers at atmospheric pressure cooling the solution to precipitate nylon 6,6 polymer and separating the nylon 6 solution from the precipitated nylon 6,6 polymer.

5. A method according to claim 4 wherein the polymer mixture is treated with aqueous acetic acid.

6. A method according to claim 5 wherein the aqueous acetic acid has a concentration of at least 70%.

7. A method according to claims 1 or 4 wherein the nylon 6 and nylon 6,6 in the mixture are in the form of fiber.

* * * * *